(12) United States Patent
Mathivanan et al.

(10) Patent No.: US 11,880,362 B2
(45) Date of Patent: Jan. 23, 2024

(54) GENERATING DEBUGGING INFORMATION FOR QUERY PLAN STEPS

(71) Applicant: MICRO FOCUS LLC, Santa Clara, CA (US)

(72) Inventors: Devosh Mathivanan, Cambridge, MA (US); Manasee Moghey, Cambridge, MA (US); Yuanzhe Bei, Cambridge, MA (US)

(73) Assignee: Micro Focus LLC, Santa Clara, CA (US)

( * ) Notice: Subject to any disclaimer, the term of this patent is extended or adjusted under 35 U.S.C. 154(b) by 106 days.

(21) Appl. No.: 17/572,169

(22) Filed: Jan. 10, 2022

(65) Prior Publication Data
US 2023/0222048 A1 Jul. 13, 2023

(51) Int. Cl.
*G06F 11/36* (2006.01)
*G06F 16/2453* (2019.01)
*G06F 16/245* (2019.01)

(52) U.S. Cl.
CPC ........ *G06F 16/2453* (2019.01); *G06F 11/364* (2013.01); *G06F 11/3636* (2013.01); *G06F 16/245* (2019.01); *G06F 16/24537* (2019.01); *G06F 16/24542* (2019.01)

(58) Field of Classification Search
CPC ........... G06F 16/2453; G06F 16/24537; G06F 16/24542; G06F 16/245; G06F 11/364
See application file for complete search history.

(56) References Cited

U.S. PATENT DOCUMENTS

| 9,665,619 | B1 | 5/2017 | Cole et al. |
| 9,779,133 | B2 | 10/2017 | Bhagavan |
| 9,823,995 | B2 | 11/2017 | Menahem et al. |
| 10,310,960 | B2 | 6/2019 | Li et al. |
| 10,324,933 | B2 | 6/2019 | Kim et al. |
| 2004/0167891 | A1* | 8/2004 | Galindo-Legaria ......... G06F 16/24537 |
| 2009/0106321 | A1* | 4/2009 | Das .......... G06F 16/24542 |
| 2016/0147637 | A1* | 5/2016 | Bhagavan ....... G06F 16/245 717/127 |
| 2020/0356599 | A1* | 11/2020 | Xia ........... G06F 16/2453 |

OTHER PUBLICATIONS

Peng, Xiao-mao, CN 108089982 (translation), Dec. 1, 2020, 18 pgs <CN_108089982.pdf>.*
Wu et al, CN 106095678, (translation), Nov. 23, 2018, 8 pgs <CN_106095678.pdf>.*
Richardson, B., "Debugging Stored Procedures in SQL Server Management Studio (SSMS)" SQLShack, Feb. 20, 2018.
FilipDeVos—sp_select, GitHub, Inc., 2021.
How to see the values of a table variable at debug time in T-SQL? Aug. 21, 2014.

* cited by examiner

*Primary Examiner* — Tuan A Vu
(74) *Attorney, Agent, or Firm* — Sheridan Ross P.C.

(57) ABSTRACT

A query plan includes steps to implement a query and debug steps interleaved among the steps. An execution engine of a database system executes each step of the query plan to realize the query. The execution engine executes each debug step of the query plan to generate debugging information for the step preceding the debug step within the query plan. The debugging information is queryable.

20 Claims, 15 Drawing Sheets

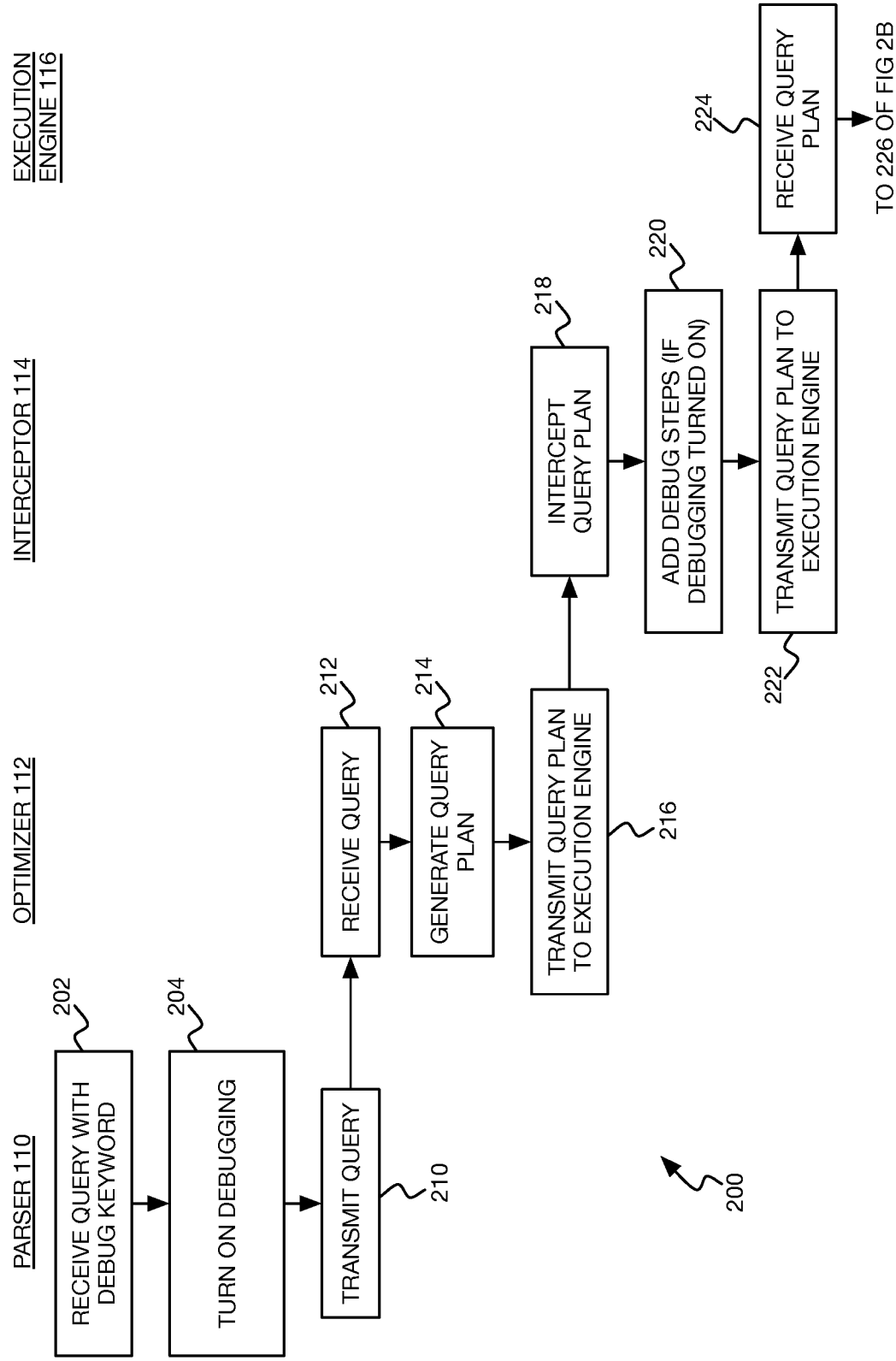

FIG 5A

<txnid>_1_Scan_2_11.txt debug_initiator_4503599627370525 9_1_Scan_2_11.dat
initiator|initiator-214432:0x7085d|4503599627370525 9|1|1|4|10
initiator|initiator-214432:0x7085d|4503599627370525 9|1|2|4

502A

LOG ENTRY

2021-12-13 07:30:05.123 Init
Session:0x7f13e25e6700-a000000000012b [Dist]
<INFO> Creating DEBUG table - [CREATE MANAGED EXTERNAL LOCAL TEMP TABLE "debug_initiator_4503599627370525 9_1_Scan_2_1 1" ( node_name VARCHAR(256), session_id VARCHAR(64), transaction_id INTEGER, statement_id INTEGER, row_number INTEGER, "col1 (a)" int , "col2 (b)" int )AS COPY FROM '/home/devoshm/Code/CLion/Vertica/repo2/server/Linux64/Test/null/tmp/debug/DebugResult/initiator/4503599627370525 60/
debug_initiator_4503599627370525 9_1_Scan_2_11 .dat' ON initiator NULL AS 'Null';]

LOG ENTRY

<txnid>_1_StorageUnion_2_9.txt debug_initiator_4503599627370525 9_1_StorageUnion_2_9.dat
initiator|initiator-214432:0x7085d|4503599627370525 9|1|1|4|10
initiator|initiator-214432:0x7085d|4503599627370525 9|1|2|2|4

— 502B 2021-12-13 07:30:05.145 Init
Session:0x7f13e25e6700-a00000000000012b [Dist]
<INFO> Creating DEBUG table - [CREATE
MANAGED EXTERNAL LOCAL TEMP TABLE
"debug_initiator_4503599627370525 9_1_StorageU
nion_2_9" ( node_name VARCHAR(256), session_id
VARCHAR(64), transaction_id INTEGER,
statement_id INTEGER, row_number INTEGER,
"col1 (a)" int , "col2 (b)" int )AS COPY FROM '/
home/devoshm/Code/CLion/Vertica/repo2/server/
Linux64/Test/null/tmp/debug/DebugResult/initiator/
4503599627370525 60/
debug_initiator_4503599627370525 9_1_StorageUn
ion_2_9.dat' ON initiator NULL AS 'Null';]

| <txnid>_1_ExprEval_0_7.txt | LOG ENTRY |
|---|---|
| debug_initiator_45035996273705259_1_ExprEval_0_7.dat initiator\|initiator-214432:0x7f085d\|45035996273705259\|1\|1\|10\|4 initiator\|initiator-214432:0x7f085d\|45035996273705259\|1\|2\|4\|2 | 2021-12-13 07:30:05.101 Init Session:0x7f13e25e6700-a0000000000012b [Dist] <INFO> Creating DEBUG table - [CREATE MANAGED EXTERNAL LOCAL TEMP TABLE "debug_initiator_45035996273705259_1_ExprEval_0_7" ( node_name VARCHAR(256), session_id VARCHAR(64), transaction_id INTEGER, statement_id INTEGER, row_number INTEGER, "col1 (t.b)" int , "col2 (t.a)" int )AS COPY FROM '/home/devoshm/Code/CLion/Vertica/repo2/server/Linux64/Test/null/tmp/debug/DebugResult/initiator/45035996273705260/debug_initiator_45035996273705259_1_ExprEval_0_7.dat' ON initiator NULL AS 'Null';] |

| <txnid>_1_Sort_1_5.txt | LOG ENTRY |
|---|---|
| debug_initiator_450359962737 05259_1_Sort_1_5.dat initiator\|initiator-214432:0x7085d\|450359962737 05259\|1\|1\|4\|2 initiator\|initiator-214432:0x7085d\|450359962737 05259\|1\|2\|10\|4 | 2021-12-13 07:30:05.134 Init Session:0x7f13e25e6700-a00000000012b [Dist] <INFO> Creating DEBUG table - [CREATE MANAGED EXTERNAL LOCAL TEMP TABLE "debug_initiator_450359962737 05259_1_Sort_1_5" ( node_name VARCHAR(256), session_id VARCHAR(64), transaction_id INTEGER, statement_id INTEGER, row_number INTEGER, "col1 (t.b)" int , "col2 (t.a)" int )AS COPY FROM '/ home/devoshm/Code/CLion/Vertica/repo2/server/ Linux64/Test/null/tmp/debug/DebugResult/initiator/ 450359962737 05260/ debug_initiator_450359962737 05259_1_Sort_1_5.d at' ON initiator NULL AS 'Null';] |

| <txnid>_1_ExprEval_1_3.txt | LOG ENTRY |
|---|---|
| debug_initiator_4503599627370525 9_1_ExprEval_1_3.dat initiator\|initiator-214432:0x7085d\|4503599627370525 9\|1\|1\|2\|4 initiator\|initiator-214432:0x7085d\|4503599627370525 9\|1\|2\|4\|10 | 2021-12-13 07:30:05.111 Init Session:0x7f13e25e6700-a000000000012b [Dist] <INFO> Creating DEBUG table – [CREATE MANAGED EXTERNAL LOCAL TEMP TABLE "debug_initiator_4503599627370525 9_1_ExprEval_1_3" ( node_name VARCHAR(256), session_id VARCHAR(64), transaction_id INTEGER, statement_id INTEGER, row_number INTEGER, "col1 (t.a)" int , "col2 (t.b)" int )AS COPY FROM '/home/devoshm/Code/CLion/Vertica/repo2/server/Linux64/Test/null/tmp/debug/DebugResult/initiator/4503599627370525 60/debug_initiator_4503599627370525 9_1_ExprEval_1_3.dat' ON initiator NULL AS 'Null';] |

| SCHEMA | NAME | KIND | |
|---|---|---|---|
| public | t | table | ←—300 |
| v_temp_schema | debug_initiator_<txnid>_1_Scan_2_11 | temp | ←—700A |
| v_temp_schema | debug_initiator_<txnid>_1_StorageUnion_2_9 | temp | ←—700B |
| v_temp_schema | debug_initiator_<txnid>_1_ExprEval_0_7 | temp | ←—700C |
| v_temp_schema | debug_initiator_<txnid>_1_Sort_1_5 | temp | ←—700D |
| v_temp_schema | debug_initiator_<txnid>_1_ExprEval_1_3 | temp | ←—700E |

FIG 8A

| NODE NAME | SESS ID | TXN ID | STMNT ID | ROW | COL(a) | COL(b) | |
|---|---|---|---|---|---|---|---|
| initiator | <sessid> | <txnid> | 1 | 1 | 4 | 10 | ←—802A |
| initiator | <sessid> | <txnid> | 1 | 2 | 2 | 4 | ←—802B |

700A

FIG 8B

| NODE NAME | SESS ID | TXN ID | STMNT ID | ROW | COL(a) | COL(b) | |
|---|---|---|---|---|---|---|---|
| initiator | <sessid> | <txnid> | 1 | 1 | 4 | 10 | ←—812A |
| initiator | <sessid> | <txnid> | 1 | 2 | 2 | 4 | ←—812B |

700B

GENERATING DEBUGGING INFORMATION FOR QUERY PLAN STEPS

BACKGROUND

Data is the lifeblood of many entities like business and governmental organizations, as well as individual users. Large-scale storage of data in an organized manner is commonly achieved using databases. A database is an organized collection of data stored and accessed electronically from a computing system. Database systems, which may also be referred to as database management systems, are implemented by computing systems and used to create and manage databases. That is, the database management system (DBMS) can be the software that interacts with end users, applications, and the database itself to capture and analyze the data.

BRIEF DESCRIPTION OF THE DRAWINGS

FIGS. 2A and 2B are flowcharts of an example method for generating debugging information during execution of a query plan to realize a query.

FIGS. 5A, 5B, 5C, 5D, and 5E are diagrams of example debugging information generated as a result of performing the method of FIGS. 2A and 2B in relation to the example query plan of FIG. 4B.

FIG. 7 is a diagram of a list of example tables generated by the method of FIG. 6 in relation to the debugging information of FIGS. 5A, 5B, 5C, 5D, and 5E.

FIGS. 8A, 8B, 8C, 8D, and 8E are diagrams of the example tables of FIG. 7 in detail, and which respectively correspond to the debugging information of FIGS. 5A, 5B, 5C, 5D, and 5E.

DETAILED DESCRIPTION

Figure 1:
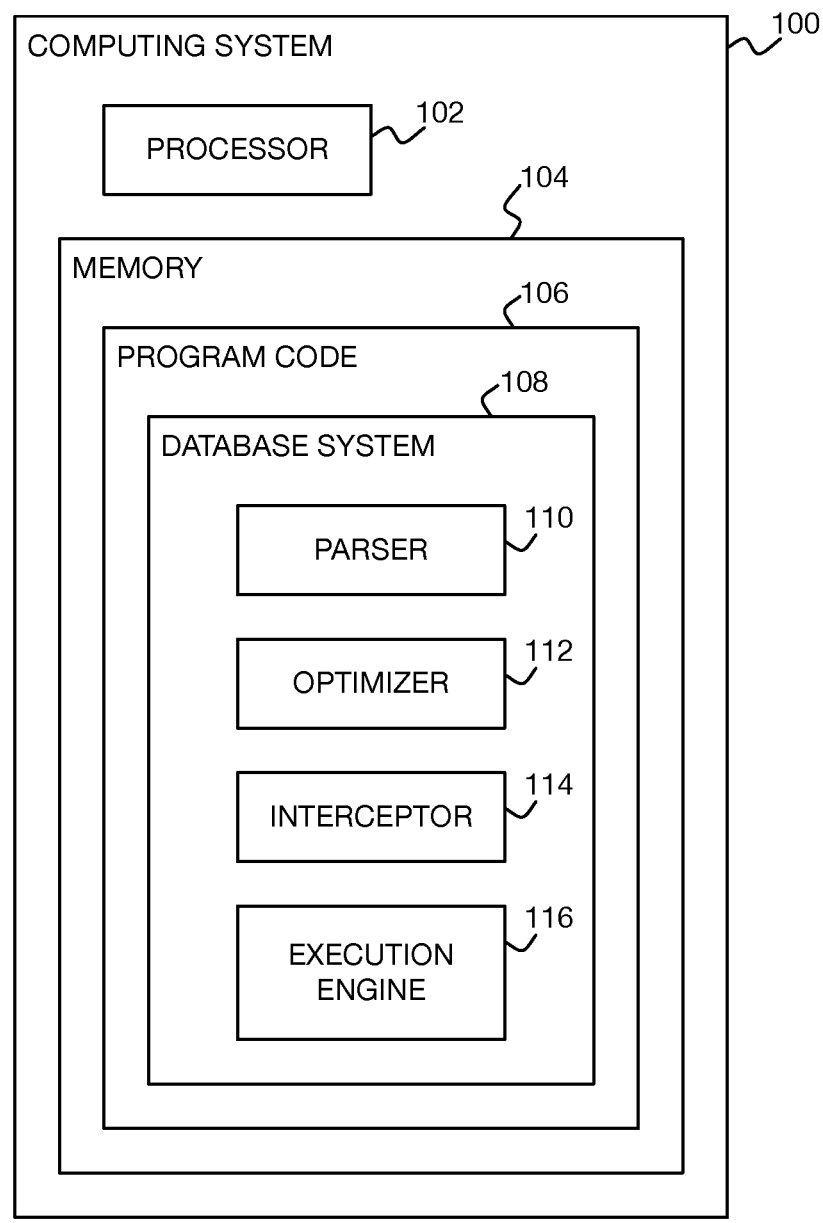
FIG. 1 is a diagram an example computing system implementing an example database system.

As noted in the background, databases created and managed by database systems store data. The data can be queried by executing queries against the database to return data that satisfies the queries. In this way, desired data can be retrieved from the database. An example of a database system is the Vertica database system available from Vertica Systems, of Cambridge, Mass., which is a subsidiary of Micro Focus International plc, of Newbury, U.K.

The Vertica database system is a column-oriented analytics platform that is designed to manage large, fast-growing volumes of data and provide fast query performance when used for data warehouses and other query-intensive applications. The Vertica database system can provide improved query performance over traditional relational database systems, and also provide high availability and exabyte scalability on commodity enterprise servers. The Vertica database is infrastructure-independent, supporting deployments on multiple cloud platforms, on-premises, as well as natively.

A database maintained by the Vertica database system can be referred to as a Vertica database. Data stored in a Vertica database can be retrieved by executing structured query language (SQL) queries. Plain query text is taken as input from a user and provided to a parser that parses the text and constructs a query tree after syntax validation. The query tree is provided to an optimizer that generates an optimal query plan to execute the input query. The query plan is then provided to an execution engine that executes the query plan to retrieve data satisfying the query from the database.

The query plan involves a series of steps that differ for each query. In some cases, the optimizer may produce a wrong plan or the execution engine may have a bug that leads to the retrieval of the wrong data for a query. Query plans can be large in size, having many steps and involving many threads in execution of their queries. As a result, it can be difficult for database administrators as well as database management system developers to identify which step or steps in a query plan are problematic.

The techniques described herein ameliorate these issues, easing the debugging process and permitting identification of the cause of a wrong result more quickly and with greater accuracy. Developers and other users are able to view intermediate results of each step involved in a query plan and also query these results conveniently via temporary tables that are automatically built from the intermediate results. As such, the developers are able to more quickly and accurately pinpoint the query plan step that is producing an unexpected result, and thus guide the developers to the program code that may be causing the error.

External tables are created from temporary files and can be queried to view intermediate results at each step. This is achieved by adding a new debug step between each of the steps in an optimizer-generated query plan. When the execution engine encounters a debug step within a query plan, it stores the results generated by the previous step in an external temporary file that and can create an external temporary table from that file. At the end of the query, developers and other users can view the generated temporary tables to identify the offending step. The external temporary table can also be manually created by using a grep command-line utility for the syntax to create the external table, and accordingly generating the table using this syntax.

FIG. 1 shows an example computing system 100. The computing system 100 may be implemented as one or more computing devices, including server computers as one example. The computing system 100 includes a processor 102 and a memory 104. The computing system 100 can include other hardware components, in addition to the processor 102 and the memory 104. The memory 104 is more generally a non-transitory computer-readable data storage medium, and can include volatile and non-volatile memory, such as semiconductor memory.

The memory 104 stores program code 106 executable by the processor 102 to implement or realize a database system 108. An example of the database system 108 includes the Vertica database management system referenced earlier. The database system 108 can include at least four components: a parser 110, an optimizer 112, an interceptor 114, and an execution engine 116.

The parser 110 parses instructions that may be entered within a command line interpreter provided by the parser 110 or otherwise received by the parser 110. The instructions can include queries, as well as keywords such as debug keywords as described later in the detailed description. The parser 110 passes queries to the optimizer 112. The optimizer 112 generates an ordered series of steps, which are referred to as a query plan, for a query and that implement the query. The optimizer 112 then transmits the query steps to the execution engine 116 for execution to realize the query (i.e., return results satisfying the query).

However, the interceptor 114, which is logically positioned between the optimizer 112 and the execution engine 116, intercepts the query plan transmitted by the optimizer 112 prior to receipt by the execution engine 116. The interceptor 114 adds a debug step after each step of the query plan generated by the optimizer 112. The query plan thus includes steps generated by the optimizer 112 interleaved with debug steps added by the interceptor 114. (In another implementation, a debug step may not be added after each step, but after a series of two or more steps.) Each debug step when executed by the execution engine 116 signals to and causes the engine 116 to generate debugging information for the preceding step executed by the engine 116.

The interceptor 114 then transmits the modified query plan, including the steps generated by the optimizer 112 and the debug steps added by the interceptor 114, to the execution engine 116. The execution engine 116 executes the steps and the debug steps in order. Execution of the steps realizes the query, returning results that satisfy the query. Execution of the debug steps generates debugging information for the executed steps, which can be used to analyze the query plan in case the returned results satisfying the query are incorrect, which may signify that the optimizer 112 generated the query plan incorrectly or that the execution engine 116 executed the query plan incorrectly. The debugging information can therefore be used to debug the optimizer 112 and/or the execution engine 116.

Figure 2B:
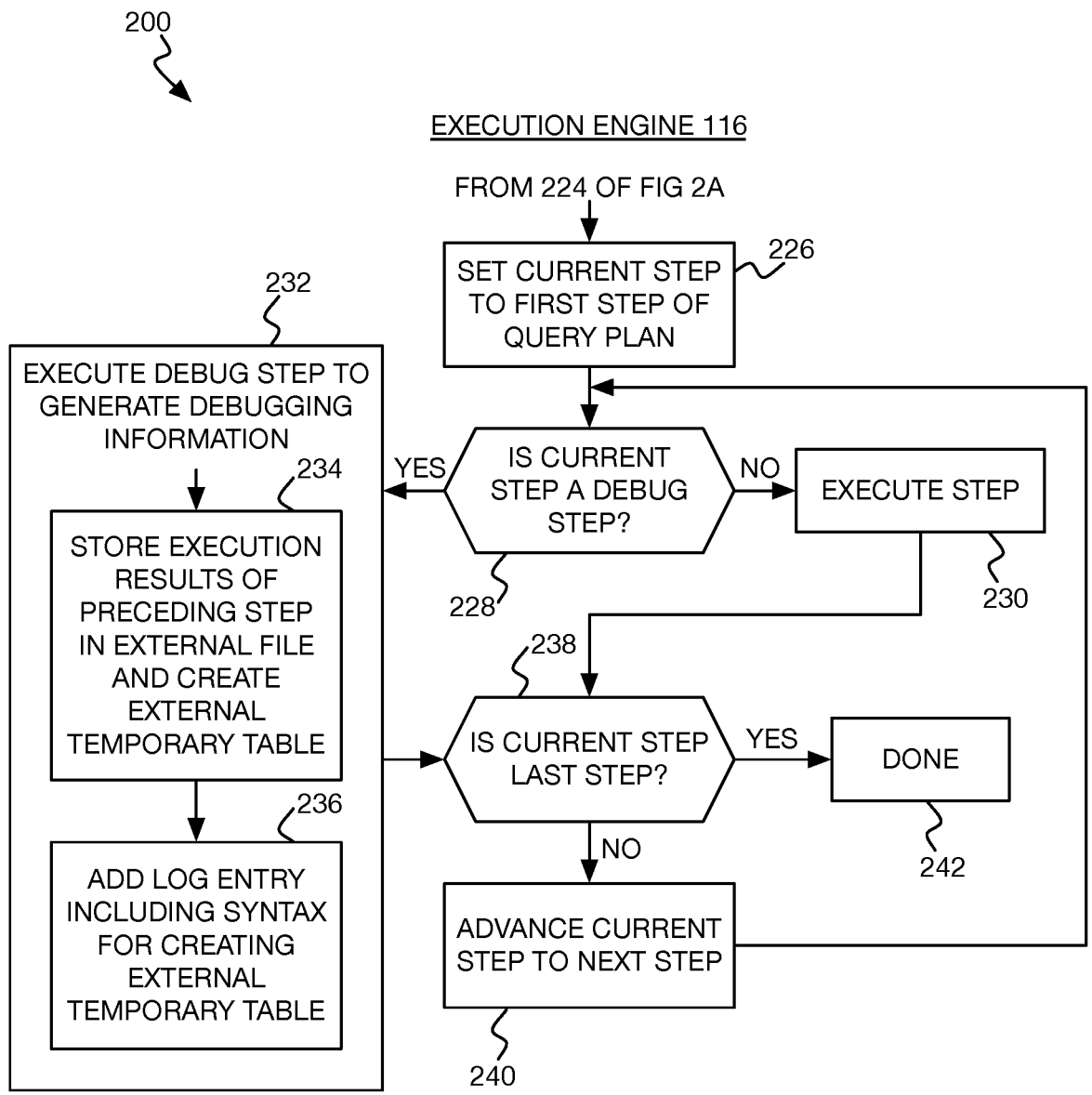

FIGS. 2A and 2B show an example method 200 for generating debugging information during execution of a query plan to realize a query. The method 200 can be implemented as the program code 106 stored on the memory 104 or other non-transitory computer-readable data storage medium and implemented by the processor 102 of the computing system 100 to realize the database system 108. That is, the method 200 can be performed by the database system 108.

The parts of the method 200 in FIG. 2A are organized over columns corresponding to the parser 110, the optimizer 112, the interceptor 114, and the execution engine 116, from left to right. The parts of the method 200 in a particular column are performed by the parser 110, the optimizer 112, the interceptor 114, or the execution engine 116 corresponding to that column. By comparison, the parts of the method 200 in FIG. 2B are performed by the execution engine 116.

Referring first to FIG. 2A, at the start of a query session, the parser 110 can receive an instruction including a query with a debug keyword (202). The instruction may be entered at a command line interface provided by the parser 110, or otherwise received by the parser 110. The query is to be processed against a particular table in which data is organized over rows and columns, as identified by the query. The debug keyword signifies that debugging information is to be generated during execution of the query plan for the query.

Figure 3A:
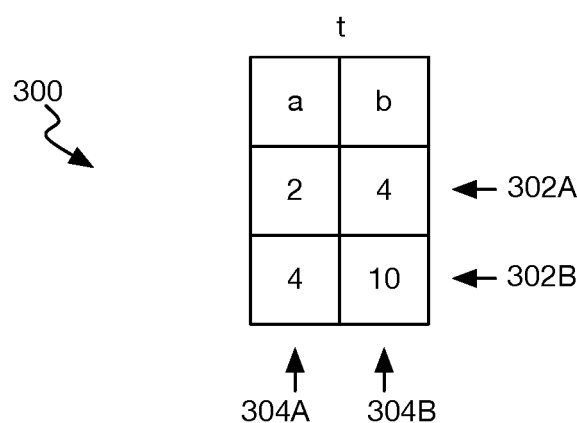
FIG. 3A is a diagram of an example table in relation to which performance of the method of FIGS. 2A and 2B is described.

FIG. 3A shows an example table 300, identified as the table t, in relation to which example performance of the method 200 is described. The table 300 has two rows 302A and 302B, which can also be referred to as records. The table 300 has two columns 304A and 304B, which can also be referred to as attributes, and which are identified as the columns a and b. The first row 302A thus has values 2 and 4 for the columns 304A and 304B, whereas the second row 302B has values 4 and 10 for the columns 304A and 304B.

Figure 3B:
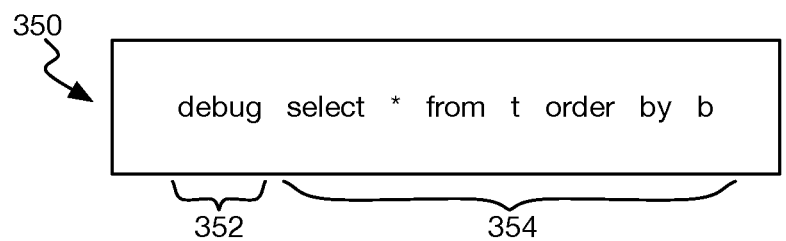
FIG. 3B is a diagram of an example query in relation to which performance of the method of FIGS. 2A and 2B is described.

FIG. 3B shows an example instruction 350 in relation to which example perform of the method 200 is described. The instruction 350 includes a debug keyword 352, "debug." The instruction 350 also includes a query 354, which is "select * from t order by b." The query 354 therefore identifies the table t, and thus is processed against the table 300.

Referring back to FIG. 2A, the parser 110 turns on debugging for the query 354 (208). Turning on debugging causes the interceptor 114 to add a debug step after each step of the query plan for the query 354, when the interceptor 114 intercepts the query plan from the optimizer 112 to the execution engine 116, before providing the modified query plan to the execution engine 116.

The parser 110 transmits the query 354 to the optimizer 112 (210), which thus receives the query 354 (212). The parser 110 in response generates a query plan that implements the query 354 (214). That is, the parser 110 generates a series of ordered steps, as the query plan, which when executed by the execution engine 116 realizes the query 354 and thus returns results from the table 300 that satisfy the query 354. The parser 110 then transmits the steps of the query plan to the execution engine 116 (216).

Figure 4A:
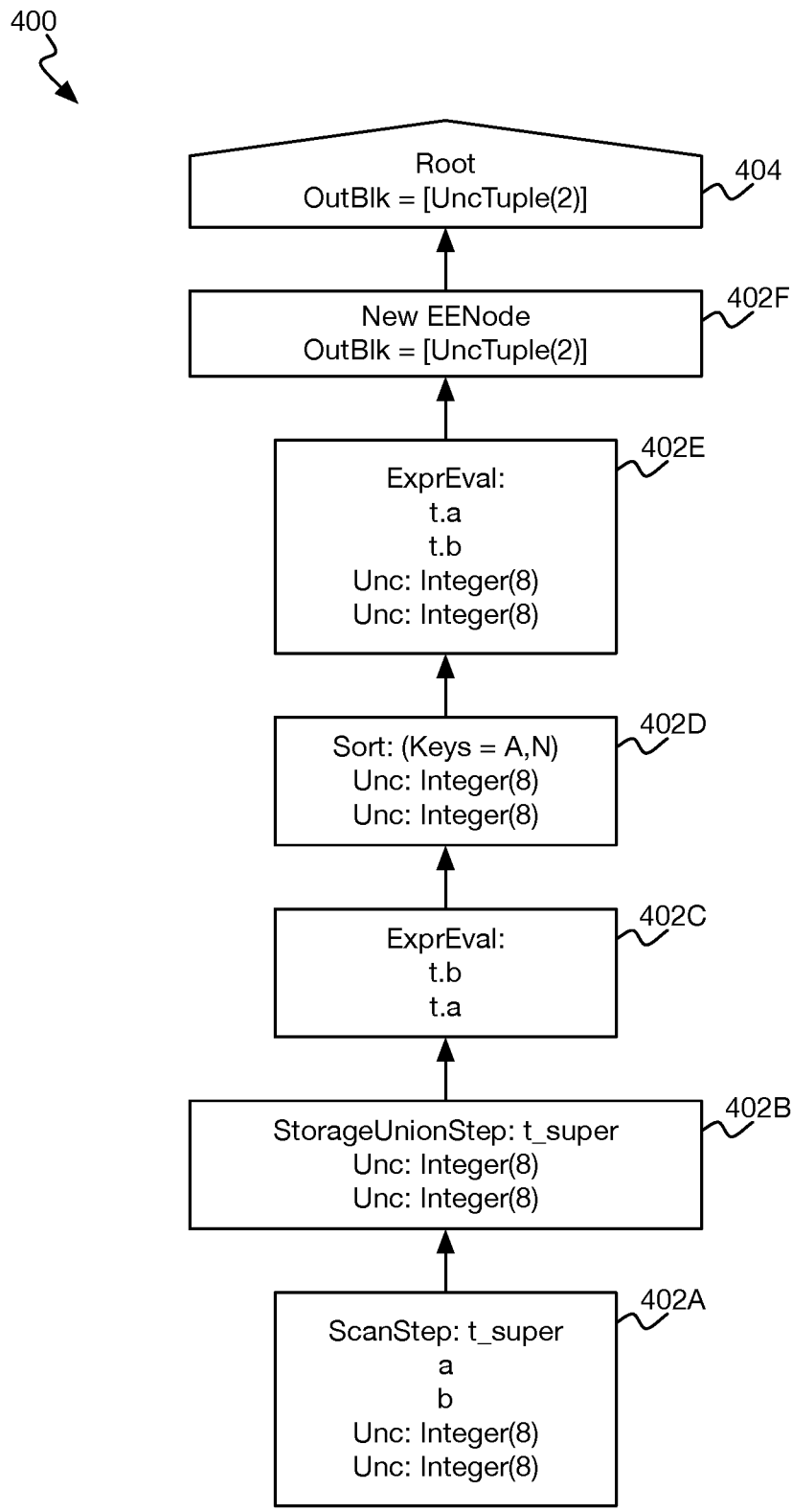
FIG. 4A is a diagram of an example query plan for the query of FIG. 3B referencing the table of FIG. 3A and in relation to which performance of the method of FIGS. 2A and 2B is described.

FIG. 4A shows an example query plan 400 for and implementing the query 354. The query plan 400 includes steps 402A, 402B, 402C, 402D, 402E, and 402F, the execution of which generates output block 404. The step 402A is a scan step ("ScanStep"), which scans for the given columns, using multiple threads if needed, and then outputs a superset of the table t ("t_super") organized over two columns a and b, with integer values that are eight bytes in length ("Unc: Integer(8)"), where "Unc" indicates that the data is unencoded, as opposed to being run-length encoded, for instance.

The step 402B is a storage union step ("StorageUnion-Step"), which combines data from the multiple threads of a preceding scan step, and that also outputs a superset of the table t ("t_super") organized over two columns a and b, with integer values that are eight bytes in length ("Unc: Integer(8)"). The step 402C is an expression evaluation step ("ExprEval), which evaluates expressions, and that outputs columns b and a of the table t ("t.b" and "t.a"). The step 402D is a sort step ("Sort") operating on keys in the provided order ("keys=A, N"), which sorts data, and that outputs the sorted data as integer values that are eight bytes in length ("Unc: Integer(8)").

The step 402E is another expression evaluation step ("ExprEval") that outputs columns a and b of the table t ("t.a" and "t.b"), as integer values that are eight bytes in length ("Unc: Integer(8)"). The step 402F is an output step ("NewEENode") that simply adds a new execution engine output block ("Outblk") to output the results of the step 402E in two-tuple form ("UncTuple(2)"). That is, the step 402F generates the output block 404 ("Outblk"), which is a root node ("Root") including the query results in two-tuple form ("UncTuple(2)").

Referring back to FIG. 2A, the interceptor 114 intercepts the query plan 400 transmitted by the optimizer 112 before the plan 400 reaches the execution engine 116 (218). The interceptor 218 adds debug steps to the query plan 400, if debugging has been turned on (220). Each debug step is added after a corresponding step of the query plan 400 as generated by the optimizer 112. The debug steps added by the interceptor 218 are thus interleaved among the steps generated by the optimizer 112. The interceptor 218 transmits the query plan 400 as modified to include debug steps to the execution engine 116 (222), which receives the modified query plan 400 (224).

Figure 4B:
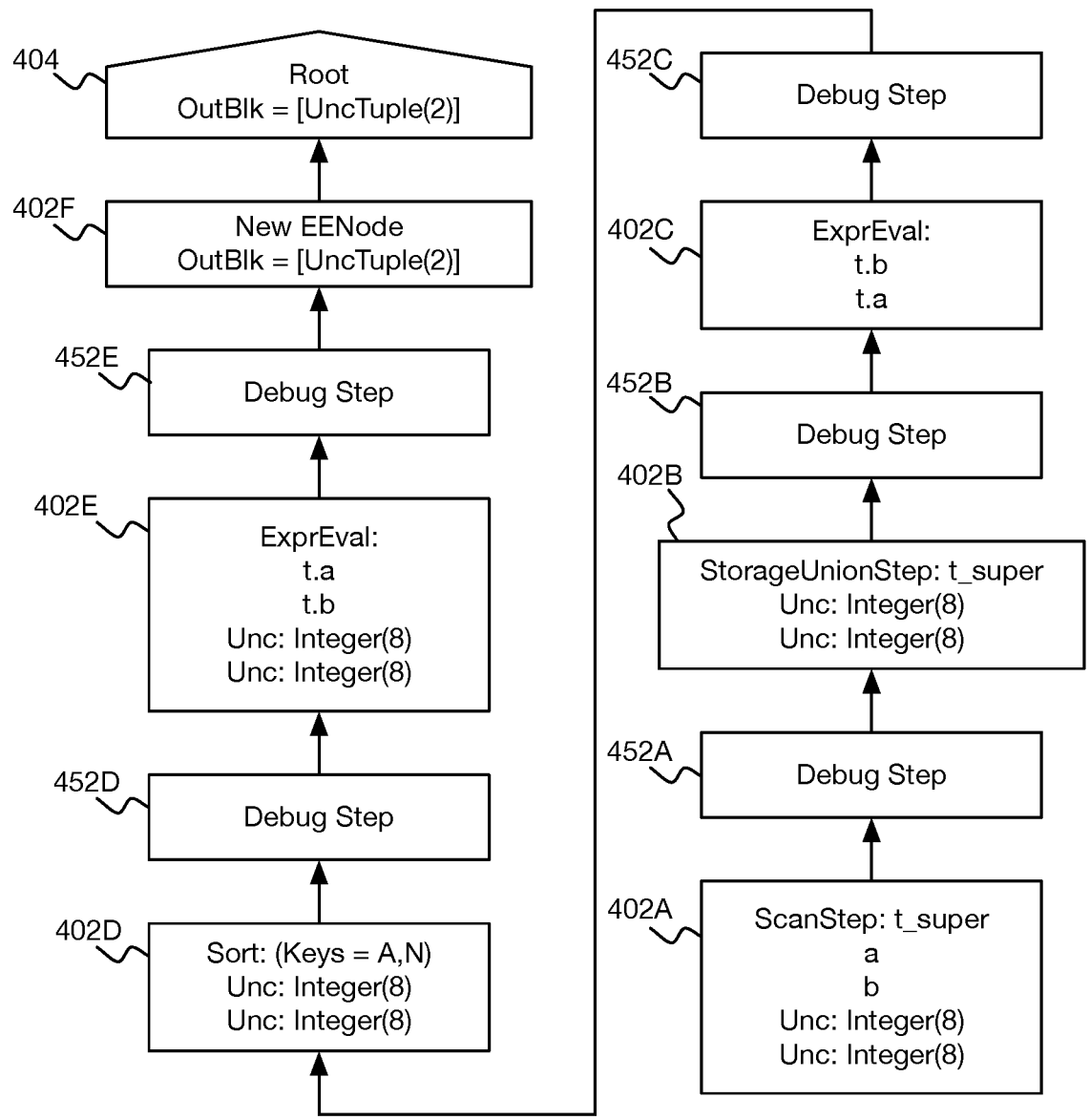
FIG. 4B is a diagram of the example query plan of FIG. 4A in which debug steps have been added as a result of performing the method of FIGS. 2A and 2B.

FIG. 4B shows an example modified query plan 400'. The query plan 400' is the query plan 400 but also includes debug steps 452A, 452B, 452C, 452D ("Debug Step"), and 452E interleaved among the steps 402A, 402B, 402C, 402D, 402E, and 402F. The debug step 452A is added immediately after the step 402A, and signifies to the execution engine 116 when executing the debug step 452A to generate debugging information for the preceding step 402A that was just executed. The debug steps 452B, 452C, 452D, and 452E are likewise immediately after the steps 402B, 402C, 402D, and 402E, respectively, and signify to the execution engine 116 to generate debugging information for these preceding steps 402B, 402C, 402D, and 402E.

In execution, the step 402A is executed, and then debugging information for the executed step 402A is generated as a result of execution of the debug step 452A. The step 402B is then executed, and debugging information for the executed step 402B generated as a result of execution of the debug step 452B. The step 402C is then executed, and debugging information for the executed step 402C generated as a result of execution of the debug step 452C. The step 402D is then executed, and debugging information for the executed step 402D generated as a result of execution of the debug step 452D. The step 402E is then executed, and debugging information for the executed step 402E generated as a result of execution of the debug step 452E.

The step 402F is finally executed, which outputs data in the form of the output block 404. No debug step is added after the step 402F, however. This is because the step 402F is a step that just outputs data, and does not otherwise manipulate the data. Generally, then, the interceptor 114 does not add debug steps after output-only steps of a query plan.

Referring to FIG. 2B, the execution engine 116 executes the steps 402A, 402B, 402C, 402D, 402E, and 402F and the debug steps 452B, 452C, 452D, 452E, and 452E in their order of appearance within the modified query plan 400'. The execution engine 116 can set a current step to the first step of the query plan 400', which is the step 402A (226). If the current step is not a debug step (228)— and thus is a step generated by the optimizer 112 to implement the query 354—then the execution engine 116 executes the step to begin or continue processing the query 354 (230). However, if the current step is a debug step (228)— i.e., as added by interceptor 114—then the execution engine 116 is said to execute the debug step in that the engine 116 generates debugging information for the preceding executed step (232).

For instance, the execution engine 116 can store execution results of the preceding step within a temporary external file associated with the query session, and may can also create a temporary external queryable table from these execution results (234). The execution engine 116 can add a log entry for the query plan to a database log (236), which specifies the syntax for creating the temporary external queryable table from these execution results. The execution results of the step 402A are thus stored and a log entry specifying the syntax for creating a queryable table from these results added when the debug step 452A is executed; the execution results of the step 402B are stored and a log entry specifying the syntax for creating a queryable table from these results when the debug step 452B is executed; and so on.

In an implementation, the temporary file in which the execution results of the preceding step are stored has a filename including the transaction identifier of the query 354, and the statement identifier, the operator name, the path identifier, and the operator identifier of the step. In an implementation, the syntax for creating the queryable table specifies the name of the queryable table as including a node name of the step, the transaction identifier of the query, and the statement identifier, the operator name, the path identifier, and the operator identifier of the step.

The node name of the step is the name of the processing node of the database system 108 that executed the step, where the database system 108 may include multiple such nodes organized in a cluster. The transaction identifier of the query 354 is the identifier for the transaction within the query session to which the query 354 pertains, if any. The statement identifier is a unique numeric identification for the statement of the step. A transaction can have multiple queries, where each query has a corresponding statement in the transaction. The operator name of the step is the name of the operator performed by the step, such as "Scan" in the "ScanStep" step 402A, "StorageUnion" in the "StorageUnionStep" step 402B, and so on. The path identifier is an identifier that the database system 108 assigns to the operator when logically grouping multiple operators. The operator identifier of the step identifies the instance of the execution engine 116 that executed the step.

After executing the current step, in either the case in which the current step is a step generated by the optimizer 112 or a debug step added by the interceptor 114, if the current step is not the last step in the modified query plan 400' (238), the execution engine 116 advances the current step to the next step within the query plan 400' (240). The execution engine 116 then repeats the method 200 at part 228. For instance, the execution engine 116 advances from the step 402A, to the step 452A, to the step 402B, and so on, until the engine 116 advances from the step 452E to the step 402F as the last step. Once the last step of the query plan 400' has been executed (238), the method 200 is finished (242).

FIG. 5A shows the file 502A storing the execution results of the step 402A and the log entry 504A specifying the syntax for creating a queryable table from these execution results, due to execution of the debug step 452A. The file 502A has a filename "<txnid>_1_Scan_2_11.txt," where <txnid> is a placeholder indicating the transaction identifier of the query 354, and as an example the statement identifier, the path identifier, and the operator identifier of the step 402A are 1, 1, and 5, respectively. The operator name of the step 402A is "Scan."

FIG. 5B shows the file 502B storing the execution results of the step 402B and the log entry 504B specifying the syntax for creating a queryable table from these execution results, due to execution of the debug step 452B. The file 502B has a filename "<txnid>_1_StorageUnion_2_9.txt," where <txnid> is a placeholder indicating the transaction identifier of the query 354, and as an example the statement identifier, the path identifier, and the operator identifier of the step 402B are 1, 2, and 9, respectively. The operator name of the step 402B is "StorageUnion."

FIG. 5C shows the file 502C storing the execution results of the step 402C and the log entry 504C specifying the syntax for creating a queryable table from these execution results, due to execution of the debug step 452C. The file 502C has a filename "<txnid>_1_ExprEval_0_7.txt," where <txnid> is a placeholder indicating the transaction identifier of the query 354, and as an example the statement identifier, the path identifier, and the operator identifier of the step 402C are 1, 0, and 7, respectively. The operator name of the step 402C is "ExprEval."

FIG. 5D shows the file 502D storing the execution results of the step 402D and the log entry 504D specifying the syntax for creating a queryable table from these execution results, due to execution of the debug step 452D. The file 502D has a filename "<txnid>_1_Sort_1_5.txt," where <txnid> is a placeholder indicating the transaction identifier of the query 354, and as an example the statement identifier, the path identifier, and the operator identifier of the step 402D are 1, 1, and 5, respectively. The operator name of the step 402D is "Sort."

FIG. 5E shows the file 502E storing the execution results of the step 402E and the log entry 504E specifying the syntax for creating a queryable table from these execution results, due to execution of the debug step 452E. The file 502E has a filename "<txnid>_1_ExprEval_1_3.txt," where <txnid> is a placeholder indicating the transaction identifier of the query 354, and as an example the statement identifier, the path identifier, and the operator identifier of the step 402E are 1, 1, and 3, respectively. The operator name of the step 402E is "ExprEval."

Figure 6:
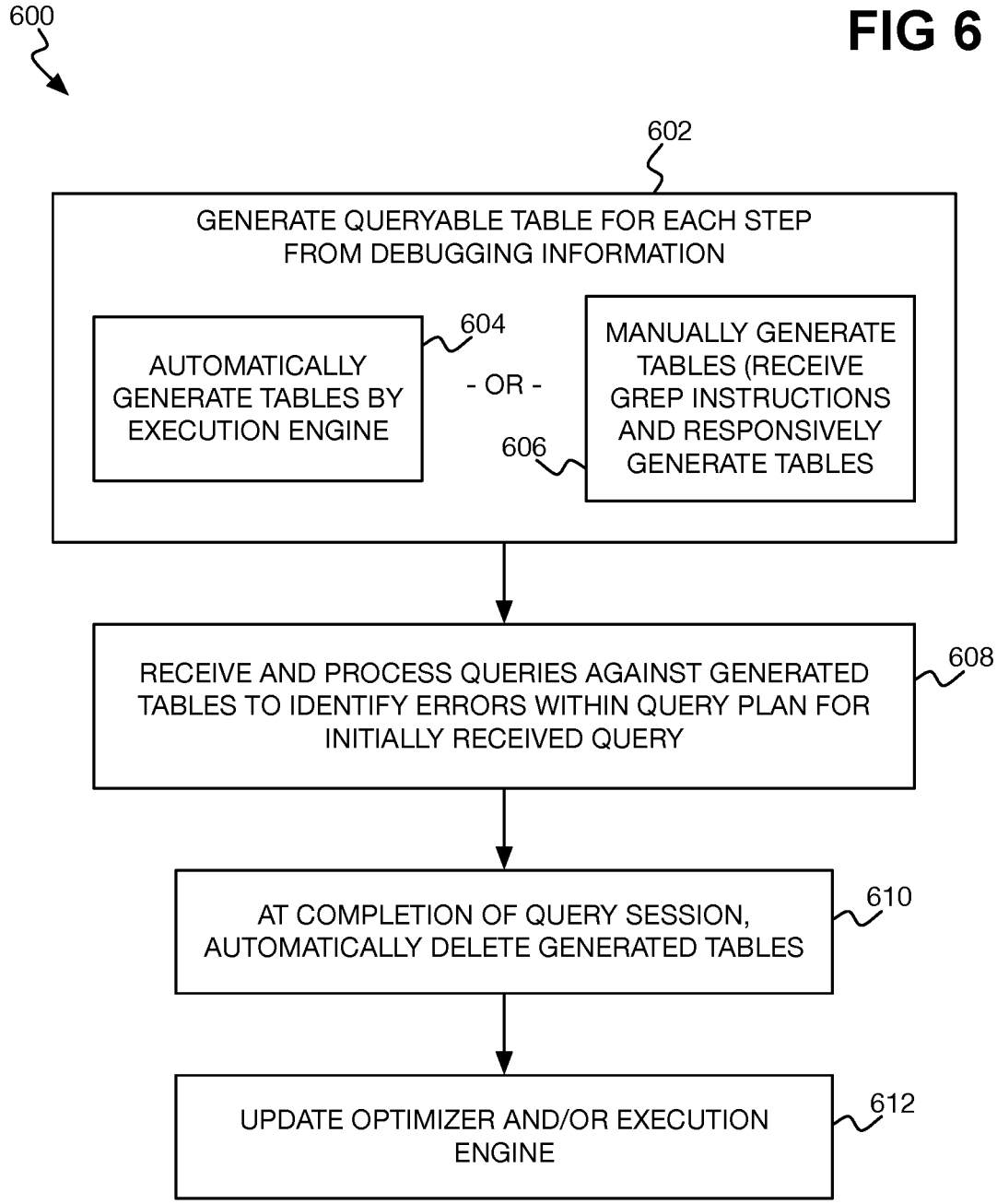
FIG. 6 is a flowchart of an example method for using the debugging information generated by the method of FIGS. 2A and 2B.

FIG. 6 shows an example method 600 for using the debugging information generated via the method 200. The method 600 can thus be performed after the method 200. As with the method 200, the method 600 can be implemented as the program code 106 stored on the memory 104 or other non-transitory computer-readable data storage medium and implemented by the processor 102 of the computing system 100 to realize the database system 108. That is, the method 600 can be performed by the database system 108.

The method 600 includes generating a queryable table for each step 402A, 402B, 402C, 402D, and 402E of the query plan 400 from the execution results stored in the respective file 502A, 502B, 502C, 502D, and 502E using the syntax specified in the respective log entry 504A, 504B, 504C, 504D, and 504E (602). In one implementation, the queryable tables can be automatically generated by the execution engine 116 (604). For instance, the execution engine 116 may automatically generate queryable tables as the debug steps 452A, 452B, 452C, 452D, and 452E are executed, or after all the debug steps 452A, 452B, 452C, 452D, and 452E are executed. In the method 200, such automatic table generation has been described as occurring in part 234 of FIG. 2B.

In another implementation, the queryable tables may be manually generated (606). For example, the parser 110 may, for the debugging information of each step 402A, 402B, 402C, 402D, and 402E, receive an instruction, such as a grep instruction, and responsively generate a queryable table. A user may enter each such instruction at the parser 110, for instance, or the parser 110 may otherwise receive the instruction. The instruction references the file name storing the execution results of a step 402A, 402B, 402C, 402D, or 402E, and includes the syntax specified by the log entry for the step 402A, 402B, 402C, 402D, or 402E. In the method 200, the syntax for manually creating a table has been described as being part of the log entry added in part 236 of FIG. 2B.

The queryable tables that are generated are queryable in that the database system 108 can itself be used to query the tables to retrieve their data. Therefore, the method 600 can include receiving and processing such queries against the queryable tables to identify or detect errors within the query plan for the initially received query 354 (608), if execution of the query 354 returned incorrect results. A user can analyze the results of queries processed against the queryable tables as a way to identify defects in the optimizer 112 resulting in incorrection generation of the query plan 400 for the query 354. At completion or the end of the query session (610), the queryable tables that have been generated are automatically deleted (610). A developer may then update the optimizer 112 and/or the execution engine 114 to fix the identified defects (612).

FIG. 7 shows a listing of the table 300 as well as the example queryable tables 700A, 700B, 700C, 700D, and 700E generated from the debugging information for the steps 402A, 402B, 402C, 402D, and 402E, respectively. The schema, name, and kind of each table 300, 700A, 700B, 700C, 700D, and 700E is listed. The schema for the table 300 is a public schema, whereas the schema for the queryable tables 700A, 700B, 700C, 700D, and 700E is a temporary schema (i.e., "v_temp_schema"). The kind of the table 300 is a table of data ("table") managed by the database system 108, whereas the kind of the queryable tables 700A, 700B, 700C, 700D, and 700E is that it is a temporary table of data (i.e., "temp").

The name of the table 300 is "t" as noted above. In an implementation, the name of a queryable table includes the name of the debug step ("debug") that result in generation of the table, the node name of the step to which the queryable table corresponds, the transaction identifier of the query 354, and the statement identifier, the operator name, the path identifier, and the operator identifier of the step in question.

The name of the table 700A is "debug_initiator_<txnid>_1_Scan_2_11," where "debug" is the name of the debug step 452A, "initiator" is the name of the processing node of the database system 108 that executed the step 402A, <txnid> is a placeholder indicating the transaction identifier of the query 354, and as an example the statement identifier, the path identifier, and the operator identifier of the step 402A are 1, 1, and 5, respectively. The operator name of the step 402A is "Scan."

The name of the table 700B is "debug_initiator_<txnid>_1_StorageUnion_2_9," where "debug" is the name of the debug step 452B, "initiator" is the name of the processing node of the database system 108 that executed the step 402B, <txnid> is a placeholder indicating the transaction identifier of the query 354, and as an example the statement identifier, the path identifier, and the operator identifier of the step 402B are 1, 2, and 9, respectively. The operator name of the step 402B is "StorageUnion."

The name of the table 700C is "debug_initiator_<txnid>_1_ExprEval_0_7.txt," where "debug" is the name of the debug step 452C, "initiator" is the name of the processing node of the database system 108 that executed the step 402C, <txnid> is a placeholder indicating the transaction identifier of the query 354, and as an example the statement identifier, the path identifier, and the operator identifier of the step 402C are 1, 0, and 7, respectively. The operator name of the step 402C is "ExprEval."

The name of the table 700D is "debug_initiator_<txnid>_1_Sort_1_5.txt," where "debug" is the name of the debug step 452D, "initiator" is the name of the processing node of the database system 108 that executed the step 402D, <txnid> is a placeholder indicating the transaction identifier of the query 354, and as an example the statement identifier, the path identifier, and the operator identifier of the step 402D are 1, 1, and 5, respectively. The operator name of the step 402D is "Sort."

The name of the table 700E is "debug_initiator_<txnid>_1_ExprEval_1_3.txt," where "debug" is the name of the debug step 452E, "initiator" is the name of the processing node of the database system 108 that executed the step 402E, <txnid> is a placeholder indicating the transaction identifier of the query 354, and as an example the statement identifier, the path identifier, and the operator identifier of the step 402E are 1, 1, and 3, respectively. The operator name of the step 402E is "ExprEval."

FIG. 8A shows the queryable table 700A generated from the execution results of the step 402A stored in the file 502A using the syntax provided in the log entry 504A. The table 700A has two rows 802A and 802B storing data for each of seven columns. The "node name" column specifies the name, of the processing node of the database system 108 that executed the step 402A, which is the same in both rows 802A and 802B ("initiator"). The "sess id" column specifies the identifier of the query session, which is the same in both rows 802A and 802B (the placeholder <sessid>).

The "txn id" column specifies the transaction identifier of the step 402A, which is the same in both rows 802A and 802B (the placeholder <txnid>). The "stmnt id" specifies the statement identifier of the step 402A, which is the same in both rows 802A and 802B (i.e., 1). The "row" column specifies the row number, which is 1 and 2, respectively, for rows 802A and 802B. The "col(a)" column specifies the value for the output a of the step 402A, which is 4 and 2, respectively, for rows 802A and 802B. The "col(b)" column specifies the value for the output b of the step 402A, which is 10 and 4, respectively, for rows 802A and 802B.

FIG. 8B shows the queryable table 700B generated from the execution results of the step 402B stored in the file 502B using the syntax provided in the log entry 504B. The table 700B has two rows 812A and 812B storing data for each of seven columns. The "node name" column specifies the name, of the processing node of the database system 108 that executed the step 402B, which is the same in both rows 812A and 812B ("initiator"). The "sess id" column specifies the identifier of the query session, which is the same in both rows 812A and 812B (the placeholder <sessid>).

The "txn id" column specifies the transaction identifier of the step 402B, which is the same in both rows 812A and 812B (the placeholder <txnid>). The "stmnt id" specifies the statement identifier of the step 402B, which is the same in both rows 812A and 812B (i.e., 1). The "row" column specifies the row number, which is 1 and 2, respectively, for rows 812A and 812B. The "col(a)" column specifies the value for the output a of the step 402B, which is 4 and 2, respectively, for rows 812A and 812B. The "col(b)" column specifies the value for the output b of the step 402B, which is 10 and 4, respectively, for rows 812A and 812B.

Figure 8C:

FIG. 8C shows the queryable table 700C generated from the execution results of the step 402C stored in the file 502C using the syntax provided in the log entry 504C. The table 700C has two rows 822A and 822B storing data for each of seven columns. The "node name" column specifies the name, of the processing node of the database system 108 that executed the step 402C, which is the same in both rows 822A and 822B ("initiator"). The "sess id" column specifies the identifier of the query session, which is the same in both rows 822A and 822B (the placeholder <sessid>).

The "txn id" column specifies the transaction identifier of the step 402C, which is the same in both rows 822A and 822B (the placeholder <txnid>). The "stmnt id" specifies the statement identifier of the step 402C, which is the same in both rows 822A and 822B (i.e., 1). The "row" column specifies the row number, which is 1 and 2, respectively, for rows 822A and 822B. The "col(t.b)" column specifies the value for the output t.b of the step 402C, which is 10 and 4, respectively, for rows 822A and 822B. The "col(t.a)" column specifies the value for the output t.a of the step 402C, which is 4 and 2, respectively, for rows 822A and 822B.

Figure 8D:

FIG. 8D shows the queryable table 700D generated from the execution results of the step 402D stored in the file 502D using the syntax provided in the log entry 504D. The table 700D has two rows 832A and 832B storing data for each of seven columns. The "node name" column specifies the name, of the processing node of the database system 108 that executed the step 402D, which is the same in both rows 832A and 832B ("initiator"). The "sess id" column specifies the identifier of the query session, which is the same in both rows 832A and 832B (the placeholder <sessid>).

The "txn id" column specifies the transaction identifier of the step 402D, which is the same in both rows 832A and 832B (the placeholder <txnid>). The "stmnt id" specifies the statement identifier of the step 402D, which is the same in both rows 832A and 832B (i.e., 1). The "row" column specifies the row number, which is 1 and 2, respectively, for rows 832A and 832B. The "col(t.a)" column specifies the value for the output t.a of the step 402D, which is 4 and 2, respectively, for rows 832A and 832B. The "col(t.b)" column specifies the value for the output t.b of the step 402D, which is 2 and 4, respectively, for rows 832A and 832B.

Figure 8E:

FIG. 8E shows the queryable table 700E generated from the execution results of the step 402E stored in the file 502E using the syntax provided in the log entry 504E. The table 700E has two rows 842A and 842B storing data for each of seven columns. The "node name" column specifies the name, of the processing node of the database system 108 that executed the step 402E, which is the same in both rows 842A and 842B ("initiator"). The "sess id" column specifies the identifier of the query session, which is the same in both rows 842A and 842B (the placeholder <sessid>).

The "txn id" column specifies the transaction identifier of the step 402E, which is the same in both rows 842A and 842B (the placeholder <txnid>). The "stmnt id" specifies the statement identifier of the step 402E, which is the same in both rows 842A and 842B (i.e., 1). The "row" column specifies the row number, which is 1 and 2, respectively, for rows 842A and 842B. The "col(t.b)" column specifies the value for the output t.b of the step 402E, which is 2 and 4, respectively, for rows 842A and 842B. The "col(t.a)" column specifies the value for the output t.a of the step 402E, which is 4 and 10, respectively, for rows 842A and 842B.

Figure 9:
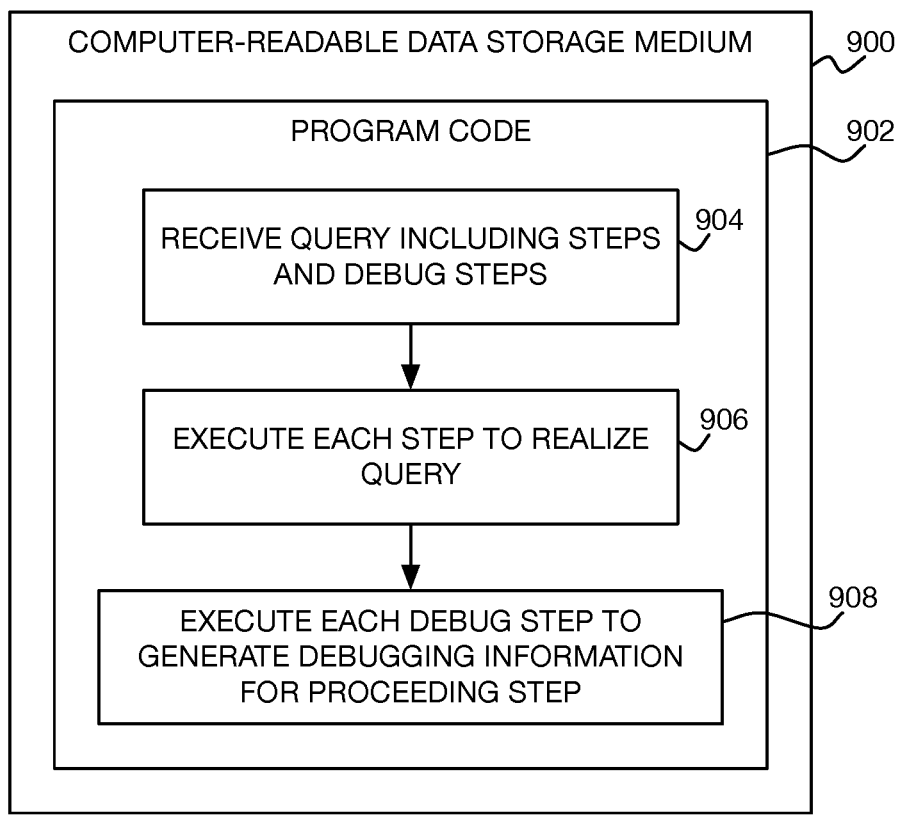
FIG. 9 is a diagram of an example non-transitory computer-readable data storage medium.

FIG. 9 shows an example non-transitory computer-readable data storage medium 900 storing program code 902 executable by the database system 108 to perform processing. The processing includes receiving, by the execution engine 116 of the database system 108, a query plan 400' including steps 402A, 402B, 402C, 402D, 402E, and 402F to implement a query 354 and debug steps 452A, 452B, 452C, 452D, and 452E interleaved among the steps (904). The processing includes executing, by the execution engine 116, each step 402A, 402B, 402C, 402D, 402E, and 402F of the query plan 400 to realize the query 354 (906). The processing includes executing, by the execution engine 116, each debug step 452A, 452B, 452C, 452D, and 452E of the query plan 400' to generate debugging information for the step 402A, 402B, 402C, 402D, and 402E, preceding the debug step 452A, 452B, 452C, 452D, and 452E within the query plan 400' (908).

Figure 10:
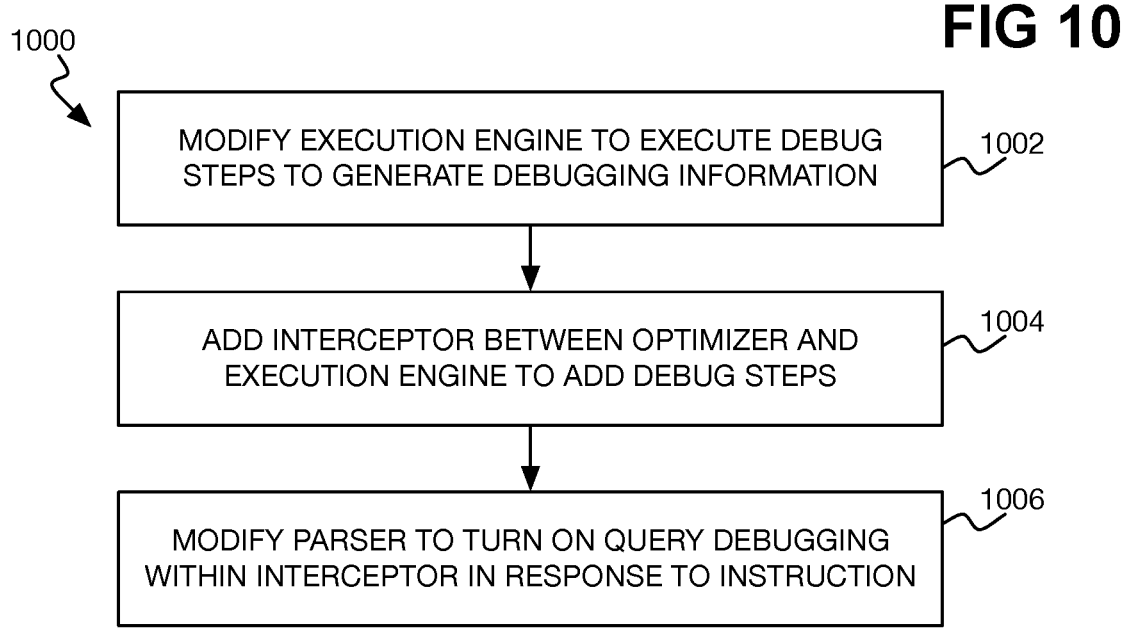
FIG. 10 is a flowchart of an example method.

FIG. 10 shows an example method 1000. The method 1000 includes modifying an execution engine 116 of a database system 108 to, after executing each step 402A, 402B, 402C, 402D, and 402E of a query plan 400 implementing a query 354, execute a subsequent debug step 452A, 452B, 452C, 452D, and 452E interleaved among the steps 402A, 402B, 402C, 402D, 402E, and 402F to generate debugging information for the step 402A, 402B, 402C, 402D, and 402E (1002). The method 1000 includes adding an interceptor 114 of the database system 108 between an optimizer 112 of the database system 108 and the execution engine 116 to add the subsequent debug step 452A, 452B, 452C, 452D, and 452E after each step 402A, 402B, 402C, 402D, and 402E of the query plan 400 to interleave the debug steps 452A, 452B, 452C, 452D, and 452E among the steps 402A, 402B, 402C, 402D, 402E, and 402F (1004). The method 1000 includes modifying a parser 110 of the database system 108 to turn on query debugging for the query 354 in response to receiving an instruction 350 including the query 354 and a debug keyword 352 (1006).

Techniques have been described for automatically generating debugging information for query plan steps generated by a database system optimizer. Queryable tables can then be automatically or manually generated from this debugging information. If execution of the query plan steps results in incorrect query results, queries can be processed against the queryable tables to identify where and how the optimizer erred in generating the query plan steps, so that the optimizer can be fixed to prevent such issues from subsequently occurring.

We claim:

1. A non-transitory computer-readable data storage medium storing program code executable by a database system to perform processing comprising:
    receiving, by an execution engine of the database system, a query plan comprising a plurality of steps to implement a query and a plurality of debug steps interleaved among the plurality of steps;
    executing, by the execution engine, each step of the query plan to realize the query; and
    executing, by the execution engine, each debug step of the query plan to generate debugging information for a step preceding the debug step within the query plan,
    wherein the debugging information is queryable.

2. The non-transitory computer-readable data storage medium of claim 1, wherein executing each debug step of the query plan to generate the debugging information for the step preceding the debug step within the query plan comprises:
    storing execution results of the step preceding the debug step within the query plan; and
    adding a log entry for the query plan specifying a syntax for creating a queryable table from the execution results of the step.

3. The non-transitory computer-readable data storage medium of claim 2, wherein the execution results are stored within a file having a filename including a transaction identifier of the query, and a statement identifier, an operator name, a path identifier, and an operator identifier of the step preceding the debug step,
    and wherein the syntax for creating the queryable table specifies a name of the queryable table as including a node name of the step preceding the debug step, the transaction identifier of the query, and the statement identifier, the operator name, the path identifier, and the operator identifier of the step preceding the debug step.

4. The non-transitory computer-readable data storage medium of claim 1, wherein the processing further comprises:
    generating a queryable table for each step from the debugging information for the step.

5. The non-transitory computer-readable data storage medium of claim 4, wherein the queryable table for each step is automatically generated by the execution engine.

6. The non-transitory computer-readable data storage medium of claim 4, wherein the processing further comprises:
    receiving a grep instruction referencing the debugging information for each step to generate the queryable table for the step,
    and wherein the queryable table for each step is generated in response to receiving the grep instruction referencing the debugging information for the step.

7. The non-transitory computer-readable data storage medium of claim 4, wherein the processing further comprises:
    receiving and processing queries against the queryable table generated for each step.

8. The non-transitory computer-readable data storage medium of claim 7, wherein an optimizer of the database system that generated the plurality of steps of the query plan and/or an execution engine of the database system that executed the plurality of steps of the query plan is updated responsive to errors identified within the query plan as a result of query results analysis of the queries processed against the queryable table generated for each step.

9. The non-transitory computer-readable data storage medium of claim 1, wherein the processing further comprises:
    at an end of a session for the query, automatically deleting the debugging information generated for each step.

10. The non-transitory computer-readable data storage medium of claim 1, wherein the processing further comprises:
    generating, by an optimizer of the database system, the plurality of steps of the query plan; and
    transmitting, by the optimizer to the execution engine, the plurality of steps of the query plan.

11. The non-transitory computer-readable data storage medium of claim 10, wherein the processing further comprises:
    intercepting, by an interceptor of the database system within which query debugging has been turned on for the query, the plurality of steps of the query plan transmitted by the optimizer prior to receipt by the execution engine;
    adding, by the interceptor, one of the debug steps after each step of the query plan to interleave the debug steps among the plurality of steps; and
    transmitting, by the interceptor to the executing engine, the query plan into which the debug steps have been interleaved among the plurality of steps by the interceptor.

12. The non-transitory computer-readable data storage medium of claim 11, wherein the processing further comprises:
    receiving, by a parser of the database system, an instruction including the query and a debug keyword;
    in response to receiving the instruction, turning on query debugging for the query within the interceptor; and
    transmitting, by the parser to the optimizer, the query.

13. A computing system comprising:
a processor; and
a memory storing program code executable by the processor to implement a database system comprising:
an execution engine to execute each of a plurality of steps of a query plan to realize a query implemented by the query plan, and to execute each of a plurality of debug steps interleaved among the plurality of steps to generate debugging information for the step preceding the debug step within the query plan,
wherein the debugging information is queryable.

14. The computing system of claim 13, wherein the execution engine is further to generate a queryable table for each step from the debugging information for the step.

15. The computing system of claim 14, wherein the database system is to receive and process queries against the queryable table generated for each step to identify errors within the query plan.

16. The computing system of claim 13, wherein the execution engine is to generate the debugging information for the step preceding each debug step within the query plan by:
storing execution results of the step preceding the debug step within the query plan; and
adding a log entry for the query plan specifying a syntax for creating a queryable table from the execution results of the step.

17. The computing system of claim 13, wherein the database system further comprises:
an optimizer to generate and transmit the plurality of steps of the query plan to the execution engine;
an interceptor to intercept the plurality of steps of the query plan transmitted by the optimizer prior to receipt by the execution engine and to add one of the debug steps after each step of the query plan to interleave the debug steps among the plurality of steps; and
a parser to turn on query debugging for the query in response to receiving an instruction including the query and a debug keyword.

18. A method comprising:
modifying an execution engine of a database system to, after executing each of a plurality of steps of a query plan implementing a query, execute a subsequent debug step of a plurality of debug steps interleaved among the plurality of steps to generate debugging information for the executed step,
wherein the debugging information is queryable.

19. The method of claim 18, wherein the execution engine is modified to generate the debugging information for the executed step within the query plan by:
storing execution results of the step within the query plan; and
adding a log entry for the query plan specifying a syntax for creating a queryable table from the execution results of the step.

20. The method of claim 18, wherein the method further comprises:
adding an interceptor of the database system between an optimizer of the database system and the execution engine to add the subsequent debug step after each step of the query plan to interleave the debug steps among the plurality of steps;
modifying a parser of the database system to turn on query debugging for the query in response to receiving an instruction including the query and a debug keyword.

* * * * *